Nov. 5, 1963
M. L. NATLAND
3,109,781
COMBINED APPARATUS OF A RETORT, FRACTIONATOR AND HEATER
FOR TREATING HYDROCARBONIFEROUS MATERIAL
Filed Nov. 6, 1958
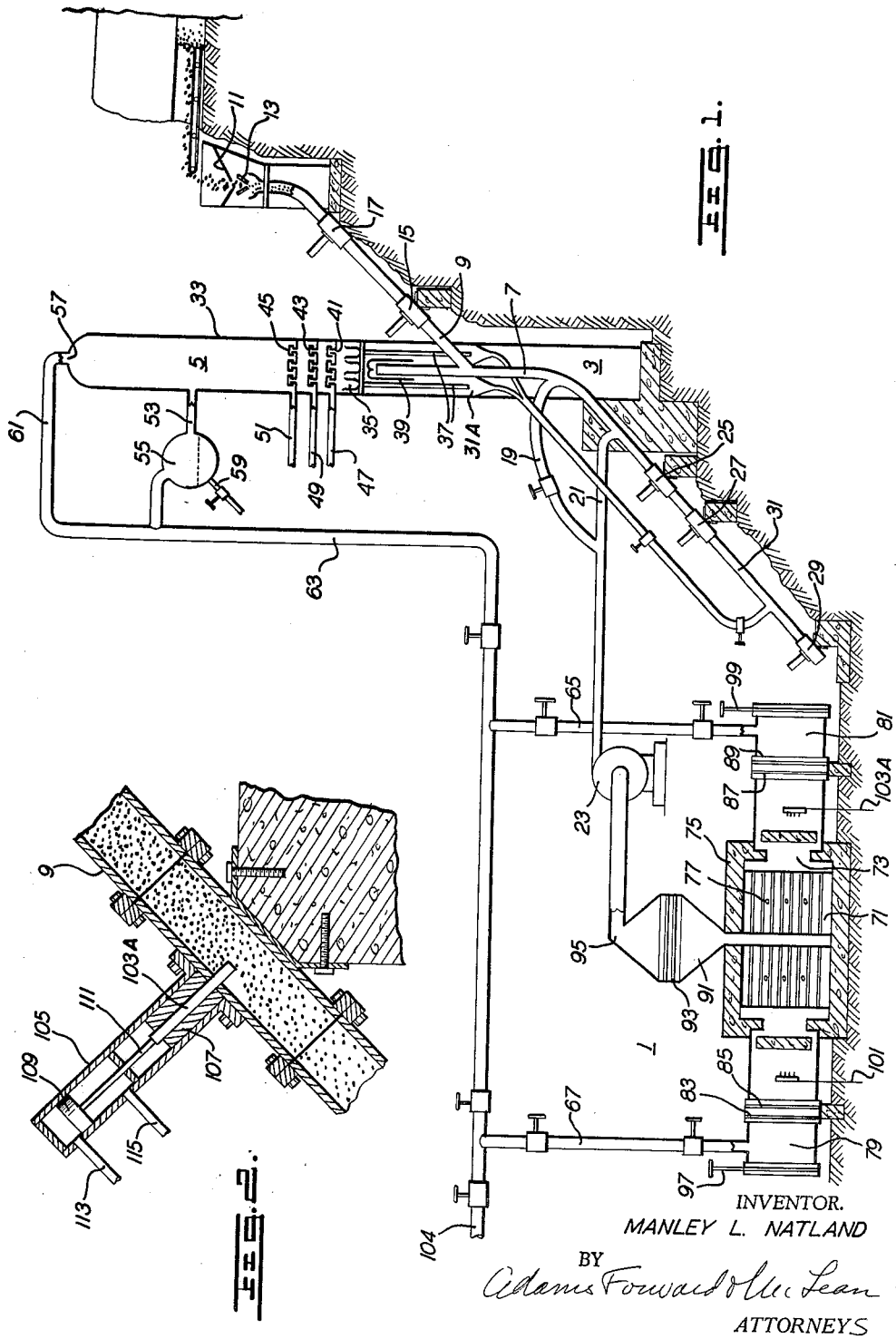
INVENTOR.
MANLEY L. NATLAND
BY
Adams Forward & McLean
ATTORNEYS United States Patent Office 3,109,781
Patented Nov. 5, 1963

3,109,781
COMBINED APPARATUS OF A RETORT, FRACTIONATOR AND HEATER FOR TREATING HYDROCARBONIFEROUS MATERIAL
Manley L. Natland, Rolling Hills, Calif., assignor to Richfield Oil Corporation, Los Angeles, Calif., a corporation of Delaware
Filed Nov. 6, 1958, Ser. No. 772,322
4 Claims. (Cl. 196—120)

The present invention relates to the treatment of hydrocarboniferous materials in order to recover therefrom useful by-products. More particularly the instant invention pertains to an apparatus especially suitable for the heat treatment of oil shales, unconsolidated oil sands, coal and other solid hydrocarboniferous materials in order to recover therefrom oils, vapors, hydrocarbon gases and other useful by-products which result from such treatment.

In general the apparatus of the present invention comprises a unitary system for heating and recovering by-products from materials such as oil shales and consist of a retort, the upper end of which is in communication with a fractionation unit and a gaseous heating unit, preferably a gas cooled nuclear reactor, the outlet of the heating unit being in communication with the lower portion of the retort and preferably the inlet of the heating unit being in communication with the upper portion of the fractionation unit. More specifically the retort can comprise an elongated substantially vertical heating chamber having inlet and outlet lines at the top and bottom respectively thereof for the entrance and exit of the hydrocarboniferous material to be treated and a gaseous product outlet at the top of the chamber and above the inlet line the product outlet being in communication with the lower part of the fractionation tower. The inlet and outlet lines have disposed through their cross-section at spaced intervals a plurality of flow regulating means, preferably hydraulically operated gates and preferably two in number in each line, these gates being reciprocally operated so that at no time are the inlet and outlet lines from the retort open thereby preventing the escape of heat and pressure from the retort. At a point above the exit line and in the lower portion of the retort there are provided means to inject gases heated to a temperature of about 500 to 1500° F., the hot gas injecting means being positioned at such an angle that fines and sediments will not enter and cause a plugging and clogging thereof. Preferably, the gas injection line should intersect the vertical retort at an acute angle. In the apparatus as described the flow of hydrocarboniferous material through the retort will, of course, be by gravity and in order to prevent the formation of clinkers and large agglomerated masses of burned out material in the bottom of the retort which would tend to result in clogging and stoppage of flow, the hot gases used in treating the material can be non-combustion supporting, i.e. a substantially oxygen-free gas such as nitrogen or hydrocarbon gases such as methane or ethane. Although the gases used in treating the hydrocarboniferous material passing through the retort can be heated to the desired temperature by any means found convenient it is preferred that the gases be heated by a controlled self-sustained nuclear reactor and if desired a gamma emitting material can be irradiated in the reactor and passed into the retort along with the heated gases, so as to produce a preliminary cracking of the distilled or vaporous hydrocarboniferous products therein.

In order to more fully describe the apparatus of the present invention reference is made to the accompanying drawings wherein:

FIGURE 1 shows in schematic form the apparatus of the present invention; and
FIGURE 2 shows a cross-sectional view through one of the hydraulic gates disposed in the entrance and exit lines of FIGURE 1.

Referring now to FIGURE 1, it can be seen that the system of the present invention comprises three integrated units designated generally as the gas heating unit 1 here shown as a controlled nuclear reactor, the retort unit 3 and the fractional distillation unit 5. Each of the three units are in intimate intercommunication one with the other in order to provide a closed processing system for the recovery of valuable by-products from the hydrocarboniferous material treated. The retort unit 3 can comprise an elongated tubular section 7 in which the material to be treated can flow downwardly as by gravity. Upwardly in the section 7 there is provided entrance line 9 for conducting the material to be treated into the retort 3 from a gravity hopper 11 and crusher 13. Disposed at any convenient location in line 9 are provided hydraulic flow regulating gates 15 and 17, the details of which are described more fully hereinafter in conjunction with FIGURE 2. Although it is preferred that two such gates be provided, more can, of course, be used if desired. The elongated tubular section 7 extends upward above the juncture of line 9 and opens into the lower section of the fractionation unit 5. The vertical heating section 7 can, of course, take other configurations if desired.

Entering the retort 3 at its lowermost end are provided hot gas lines 19 and 21 conducting the non-combustion supporting or oxygen-free gases from the heating source 1 via pump 23 to the retort unit 3. The lines 19 and 21 are disposed so that they rise upward from the point of entry into the retort and they can be provided with screens across their juncture with the retort, all for the purpose of preventing or impeding the crushed material and sediment in the tubular section 7 from flowing into the hot gas lines and causing plugging and clogging thereof. Preferably, lines 19 and 21 will join the retort at an acute angle. It is to be realized, of course, that more or less hot gas lines can be provided depending upon the volume of hot gas necessary to treat the material descending downwardly in the retort.

Beneath the juncture of the hot gas entrance lines 19 and 21 there is provided a second series of hydraulic flow regulating gates 25, 27 and 29 disposed at intervals in the hydrocarboniferous material exit line 31.

As mentioned previously the upper end of section 7 communicates with and opens into the lower section of fractional distillation unit 5. Unit 5 can comprise a fractionation tower 33, the lower part of which can be provided with cyclone separators 35 having diplegs 37 for separating any dust and sediments which may be carried upward with the gases out of the retort 3 and into the fractionation unit 5. The diplegs 37 can extend downward and terminate as here shown in the converging material exit line 31A of the retort 3. A bell deflector 39 is provided over the point where the opening from the retort extends into the unit 5 so as to deflect the rising gases downward and assist in the separation of the dust and sediments.

A plurality of liquid-vapor condensation plates 41, 43 and 45 are provided in the fractionation tower 33 having liquid-take-off lines 47, 49 and 51 leading therefrom in order to condense and withdraw a liquid fraction boiling at the desired range. Plates 41, 43 and 45 can be of any conventional design such as a bubble cap type and as many levels as necessary or desired can be provided. The heavier gases and vapors are withdrawn from tower 33 as at 53 and sent to condenser 55 wherein the heavier lower boiling materials are separated and withdrawn as a liquid product and the lighter higher boiling materials are separated and withdrawn as a gaseous product. The lighter gaseous materials in tower 33 are taken off as overhead as at 57.

The liquid products withdrawn from condenser 55 and tower 33 via lines 59 and 47, 49 and 51, respectively, can be conducted to suitable storage facilities or to various processing and refining facilities as desired. The gaseous products collected from condenser 55 and as overhead via line 61 are recycled to the heating unit 1 via lines 63 and branch lines 65 and 67 in order to be reheated and again used in treating the hydrocarboniferous material in the retort 3.

The heating unit 1 can be, as intimated previously, any type of heating arrangement desired so long as the gases to be used in treating the hydrocarboniferous material are heated to temperatures in the range of about 500 to 1500° F. It is preferred, however, that the heating of the gases be accomplished by means of a controlled nuclear reactor and this reactor can be any of those known to the art which employ for instance, a forced circulation of gas as the cooling medium. For instance, it can be a heterogeneous natural uranium, graphite moderated reactor such as described in U.S. Patent Nos. 2,836,554 or 2,708,656 to Fermi et al. or as described in "Selected Reference Material, United States Atomic Energy Program-Research Reactors," U.S. Government Printing Office, 1955, pp. 384 to 442, or it can be any one of the numerous enriched uranium reactors moderated by other materials such as water or heavy water. In general I prefer a reactor of the type described in the above-noted Fermi et al. Patent No. 2,836,554. Reactors of this type can be operated at power levels of about 60,000 kilowatts to produce exit cooling gases having temperatures in the range of about 500 to 1500° F. and which are sufficiently high for purposes of the present invention.

Referring to the drawing, it can be seen that the reactor can comprise a reactive core constructed of graphite blocks 71 interlocked together to provide a moderating shield and having channels 73 therethrough to accommodate aluminum finned tubes loaded with the reactive uranium slugs. The reactive core is surrounded by a concrete shield 75 the thickness and density of which can be any found necessary to contain the radioactivity produced by the fission reaction. For the specific details of construction, geometry, critical mass of uranium, etc. of the reactive core, reference is made to the above-noted patents and publication incorporated herein by reference. In reactors of this type the finned tubes loaded with uranium are constructed so that passageways are provided for the ingress and egress of air or other cooling gaseous medium such as methane or ethane therethrough. The rate of fission and hence the temperature produced by the reactor can be controlled by the withdrawal or insertion of boron control rods as shown at 77. Cooling gas is drawn into and through the reactor at either end by means of ducts 79 and 81 having filters 83, 85, 87 and 89 therein for removing impurities and dust particles from the cooling gases which may tend to poison the nuclear fission reaction. Heated gases are withdrawn from the reactor by means of outlet 91 after which they pass through filter 93. The filtered hot gases are then conducted by way of manifold 95 to compression pump 23, and thence to the retort unit 3 by means of lines 19 and 21 as hereinbefore set forth. Gates 97 and 99 can be placed at each end of ducts 79 and 81 in order to seal the reactor so as to provide a closed gaseous cycle through the entire system and, if necessary, a heat exchanger (not shown) can be interposed in line 63 to cool the gases prior to return to the nuclear reactor 1.

The system of the present invention can be operated as follows. A hydrocarboniferous material such as oil shale can be fed into hopper 11 and ground to any desired particle size, preferably less than about 5 mm. by means of crusher 13. Gates 15 and 17 are opened and the crushed shale flows downwardly by gravity into the elongated section 7 of retort 3. The level of shale in section 7 is maintained at about the height of the juncture of line 9 with section 7 or somewhat below. In section 7 the shale is contacted with the hot oxygen-free gases entering the retort 3 by means of lines 19 and 21 and the temperature of the shale is increased to such a point that the petroleum is vaporized therefrom. Since the gases are substantially oxygen-free the hydrocarbon will be vaporized without causing a burning of the solid material and hence the tendency of the solids to fuse and agglomerate will be substantially lessened. The hot gases and the vaporized hydrocarbons rise upward in the tubular section 7 and pass into the fractionation unit 5.

By contacting the shale in this manner it is stripped of its hydrocarbon content as it passes downwardly in section 7 countercurrently through the uprising hot non-oxygen containing gases and the spent shale passes out of the retort unit via line 31 and hydraulic gates 25, 27 and 29. The flow of shale through the retort is adjusted to the desired rate by regulating the amount of shale introduced and withdrawn by a suitable positioning of the hydraulic gates above and below the retort. These gates as mentioned previously are provided at least in pairs so that the pairs can be reciprocally operated thus allowing for the continuous flow of shale yet at all times maintaining the retort section closed in order to prevent the escape of pressure and heat therefrom.

The vapors and hot gases in retort section 7 will rise upwardly, leaving the retort at the upper open end thereof and entering the lower section of fractionation tower 33 wherein any dust and particles carried upward with the ascending gases and vapors will be removed by the cyclone separators 35 and returned to the spent shale discharge line 31 by the diplegs 37. The gases and vapors will pass upward in the tower 33 and the various constituents thereof will condense at the appropriate temperature level and are removed as a liquid product by lines 47, 49 and 51. The heavier hydrocarbon gases are removed from the tower at 53 and condensed in condenser 55 with the liquid therefrom being directed to appropriate storage or further processing facilities. The lighter gases composed to a large extent of the treating gases initially injected into the retort are removed as overhead via line 61 and, joined by the gases withdrawn from condenser 55 are recycled via line 63 and branch lines 65 and 67 to the heating unit 1 to be reheated and recharged to the retort unit 3 via lines 19 and 21. Pump 23 is operated so as to provide the vacuum necessary to draw the cooling gases through the heating unit and to supply the necessary pressure in the retort unit.

If desirable the hydrocarbon vapors ascending in retort 3 and tower 33 can be further benefacted by introducing, along with the hot treating gases, a gamma emitting material, the gamma radiation causing a preliminary cracking of some of the heavier hydrocarbons and hence the production of more useful products. Thus, I can introduce into the nuclear reactor 1, along with the heat exchange gases or separately if desired, a material which upon bombardment in the reactor will become radioactive and in the subsequent process of decay, emit gamma radiation. This material can be, if desired, any number of substances. I, however, prefer to utilize water as the material to be irradiated, this preference being due to the relatively short half life of the radionucleides produced and to the gamma ray emitting properties of the radionucleide. For instance, water under radiation will yield $N^{16}$ having a half life of about 7.35 seconds and a gamma ray activity of about 6.2 mev. and possibly some $O^{19}$ having a half life of about 29.4 seconds and a gamma ray activity of about 1.6 (70%) mev. A material having a relatively short half life is advantageous because of the desirability of producing hydrocarbon products which do not themselves carry over a high degree of radioactivity and thus present additional problems in handling and storage. To accomplish this result I can provide spray injectors 101 and 103 in the intake ducts 79 and 81 of the reactor unit 1 and a suitable quantity of water can be injected along with the heat exchange gases into and through the nuclear reactor, this water being irradiated and carried to the retort unit 3 as radioactive steam along with the hot treating gases.

The treating gases passing through the reactor 1 and retort 3 can in general be any non-combustion supporting or substantially oxygen-free inert or heat stable gas desired. For instance, nitrogen, carbon dioxide, helium, argon, and hydrocarbon gases such as methane and ethane can be utilized as the heat exchange gas if desired and these gases can be continuously recycled to the reactor. If necessary, make-up gases can be provided as necessary by means of line 104. It is preferred, however, that the heat exchange and treating gas be a light hydrocarbon such as methane or ethane since limited amounts of this gas will be recoverable from the hydrocarboniferous material treated and hence very little if any make-up gas will be necessary. It is, of course, feasible that an excess of such gases will be produced in the treatment and, if necessary, any excess can be taken from the system also through line 104 and conducted to suitable storage facilities.

As mentioned previously the flow regulating means in the entrance line 9 and exit line 31 can take the form of hydraulically operated gates extending through the cross-section of the lines. Thus, as shown in FIGURE 2 the flow regulating means can comprise a gate 103A slidably mounted in housing 105 attached to the outer wall of the material flow line 106. The gate 103 can move through sealing gasket 107 disposed inside of housing 105 and it can movably extend vertically into the flow line 106. Housing 105 forms a cylinder in which piston head 109 attached to rod 111 and gate 103A slidably operates and fluid flow lines 113 and 115 are provided respectively above and below the piston 109. When it is desired to lower the gate and thus block the flow of hydrocarboniferous material fluid can be pressurized into the cylinder through line 113 and the piston and gate 103A will be forced downward thus cutting off the flow. Fluid can be withdrawn from the upper part of the cylinder 105 through line 113 and pressured into the lower part of the cylinder through line 115 in order to raise the piston and the gate 103A so as to continue the flow of material through the line. By reciprocally operating a plurality of such gates both above and below the retort it is obvious that a continuity of flow of the material can be achieved through the retort without at any time permitting either the entrance or exit lines to be open thus avoiding undue losses of pressure and heat in the retort.

I claim:

1. In a system for the treatment of hydrocarboniferous material the combination which comprises a gaseous retort means, a gaseous heating means and a fractionation means, said retort means consisting of an elongated substantially vertically disposed heating chamber having a hydrocarboniferous material inlet means at its upper end and a hydrocarboniferous material outlet means at its lower end, said inlet and outlet means each having disposed through their cross-section a plurality of flow regulating means, said regulating means being operable to provide a semi continuous gravity flow of material through the heating chamber while maintaining the chamber continuously closed to the atmosphere, means for injecting hot non-combustion supporting gases into the chamber at the lower end thereof and above said outlet means, and means at the upper end of said chamber to withdraw gaseous and vaporous products therefrom, said withdrawal means communicating with the lower portion of said fractionation means, said heating means consisting of a gas cooled controlled nuclear reactor having cool gas inlet means and heated gas outlet means, said outlet means communicating with the hot gas injection means of said retort, and said cool gas inlet means communicating with the upper portion of said fractionation means.

2. An apparatus as in claim 1 wherein the hot gas injecting means intersects the vertical heating chamber at an acute angle.

3. An apparatus as in claim 1 wherein the flow regulating means are a pair of reciprocally operated gates.

4. A system as set forth in claim 1 including means for injecting materials into said reactor which are rendered radioactive and which aid, when radioactive, to fractionate the non-combustible gases.

References Cited in the file of this patent

UNITED STATES PATENTS

| 1,571,877 | McElroy | Feb. 2, 1926 |
| 1,901,169 | Karrick | Mar. 14, 1933 |
| 1,974,295 | Alther | Sept. 18, 1934 |
| 2,780,586 | Mader | Feb. 5, 1957 |
| 2,814,587 | Van Dijck | Nov. 26, 1957 |

FOREIGN PATENTS

| 521,286 | France | Mar. 4, 1921 |
| 631,069 | Great Britain | Oct. 26, 1949 |

OTHER REFERENCES

"Symposium on Saline Water Conversion" (Mason), published National Academy of Sciences, National Research Council (Washington, D.C.), 1958 (pages 398–407 relied upon).